United States Patent [19]

Aihara

[11] Patent Number: 5,119,404

[45] Date of Patent: Jun. 2, 1992

[54] SIGNAL RECEIVER

[75] Inventor: Shuichi Aihara, Tokyo, Japan

[73] Assignee: Japan Aviation Electronics Industry Limited, Tokyo, Japan

[21] Appl. No.: 562,914

[22] Filed: Aug. 6, 1990

[51] Int. Cl.$^5$ .............................................. H04L 25/06
[52] U.S. Cl. ..................................... 375/76; 328/146; 307/354; 330/252; 330/69
[58] Field of Search .................. 375/76; 307/354, 355, 307/358, 359; 330/252, 69; 328/146

[56] References Cited

U.S. PATENT DOCUMENTS 4,736,391 4/1988 Siegel ..................................... 375/76

FOREIGN PATENT DOCUMENTS 0347359 12/1989 European Pat. Off. .
55-150645 11/1980 Japan .
59-168748 9/1984 Japan .

Primary Examiner—Douglas W. Olms
Assistant Examiner—Tesfaldet Bocure
Attorney, Agent, or Firm—Pollock, Vande Sande and Priddy

[57] ABSTRACT

In a signal receiver which amplifies and compares a digital input signal with a threshold value for level decision, the digital input signal is applied to one input terminal of a summing amplifier, the level of the summed output is compared with the threshold value for level-deciding the input signal, and the peak level of the summed output is held by a peak hold circuit. The difference between the peak level held by the peak hold circuit and a reference voltage is amplified by a differential amplifier and is then applied to the other input terminal of the summing amplifier, and its summed output is clamped to the reference voltage, thereby preventing an error in deciding a low-level input signal.

3 Claims, 3 Drawing Sheets

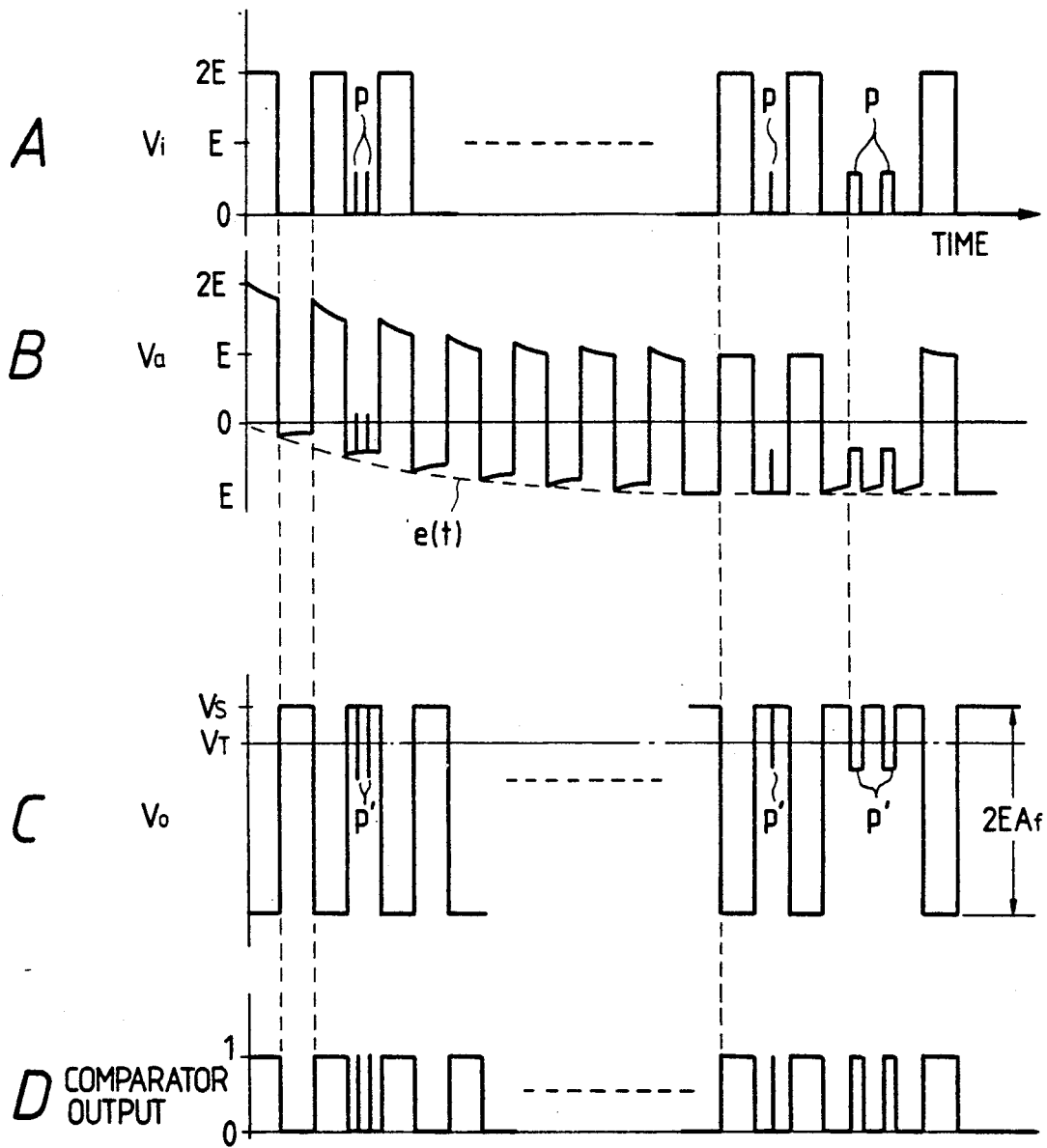

5,119,404

SIGNAL RECEIVER

BACKGROUND OF THE INVENTION

The present invention relates to a signal receiver which receives an optical or electric digital signal, amplifies it by use of a receiving amplifier and then determines its logical level by use of a comparator.

In this kind of signal receiver heretofore employed, a DC blocking capacitor is provided at the input side of the receiving amplifier when the DC component of an input signal varies great by or when the drift of, for example, a photoelectric converter at the input side is large. FIG. 1 shows a prior art example of the signal receiver of the type receiving an optical digital signal. An input optical signal Pin (row A in FIG. 2) is applied to a photoelectric converter 11, in which it is converted by a photodiode 1a to an electric signal, which is amplified by an amplifier 1b. The amplified signal is provided via a DC blocking capacitor 12 to an inverting amplifier 13, in which it is further amplified, and the amplified output (row B in FIG. 2) is provided at one input terminal of a comparator 14. The DC blocking capacitor 12 and the inverting amplifier 13 constitute a receiving amplifier 15.

As shown at row B in FIG. 2 the output Vo of the receiving amplifier 15 undergoes a transient phenomenon immediately after the arrival of an input signal, under the influence of a time constant circuit which is defined by the capacitance of the DC blocking capacitor 12 and the input resistance of the inverting amplifier 13. The output Vo of the receiving amplifier 15 is compared with a threshold value $V_T$ in the comparator 14, from which is provided a signal (row C in FIG. 2) which goes high or low depending on whether the output Vo is smaller or greater than the threshold value $V_T$.

Assuming that the threshold voltage $V_T$ of the comparator 14 is set to a low level shown at row B in FIG. 2 and, as shown in row A of FIG. 2, a second input signal p of an amplitude appreciably smaller than that of a first input signal S is applied in the OFF period of the first input signal S of an ordinary amplitude, then some of the second input signal pulses p, for example, two pulses at the right-hand side, cannot be detected by the comparator 14 as shown in row C of FIG. 2. If the threshold voltage $V_T$ is set to a high level as indicated by $V_T'$ at row B in FIG. 2, the comparator output remains high-level for a certain period of time after arrival of an input signal as shown at row D in FIG. 2 and no signal detection is possible during this time. Thus, the conventional signal receiver is defective in that some of the second digital signals p of a small amplitude, received during the OFF period of the first digital signal S of a large amplitude, are not detected due to the aforementioned transient phenomenon of the receiving amplifier.

SUMMARY OF THE INVENTION

It is therefore an object of the present invention to provide a signal receiver which is free from the foregoing defect of the prior art.

The signal receiver of the present invention has an arrangement in which the input digital signal is amplified by a receiving amplifier and the amplified output is compared by a comparator with a threshold value to thereby perform a logical level decision. The receiving amplifier is made up of a summing amplifier, a peak hold circuit, and a differential amplifier.

The summing amplifier sums and amplifies the digital signal input and the output of the differential amplifier and provides the amplified output to the comparator of the next stage. The peak hold circuit holds the peak level of the output signal waveform of the summing amplifier, and the signal held by the peak hold circuit is applied to the differential amplifier for comparison with a reference signal, a signal corresponding to the difference between the two signals being provided to the summing amplifier.

BRIEF EXPLANATION OF THE DRAWINGS

FIGS. 4A-4D are a set of waveform diagrams showing signals occurring at respective parts in the embodiment depicted in FIG. 3;

DETAILED EXPLANATION OF THE PREFERRED EMBODIMENT

Figure 1:
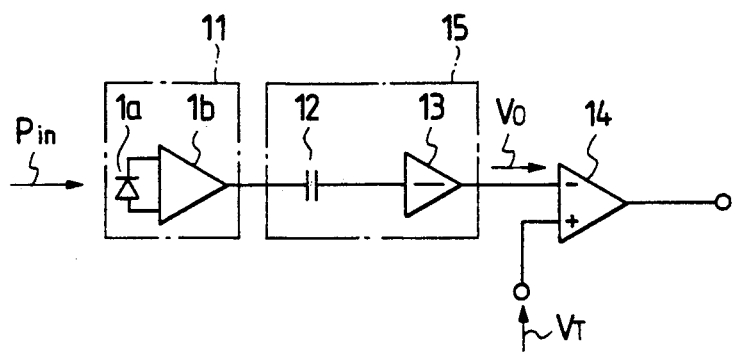
FIG. 1 is diagram showing a conventional signal receiver for receiving an optical signal.
Figure 2:
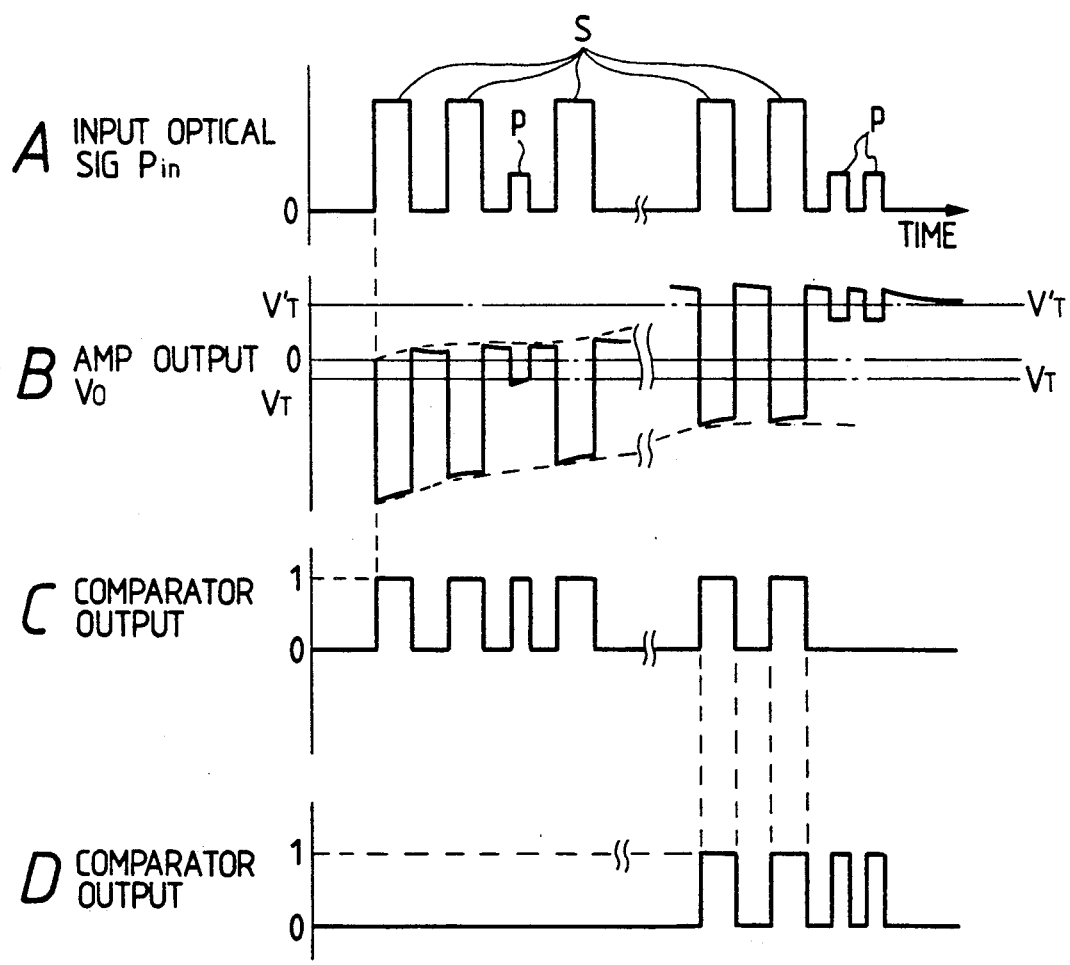
FIGS. 2A-2D are a waveform set of diagrams showing signals occurring at respective parts of the signal receiver depicted in FIG. 1.
Figure 3:
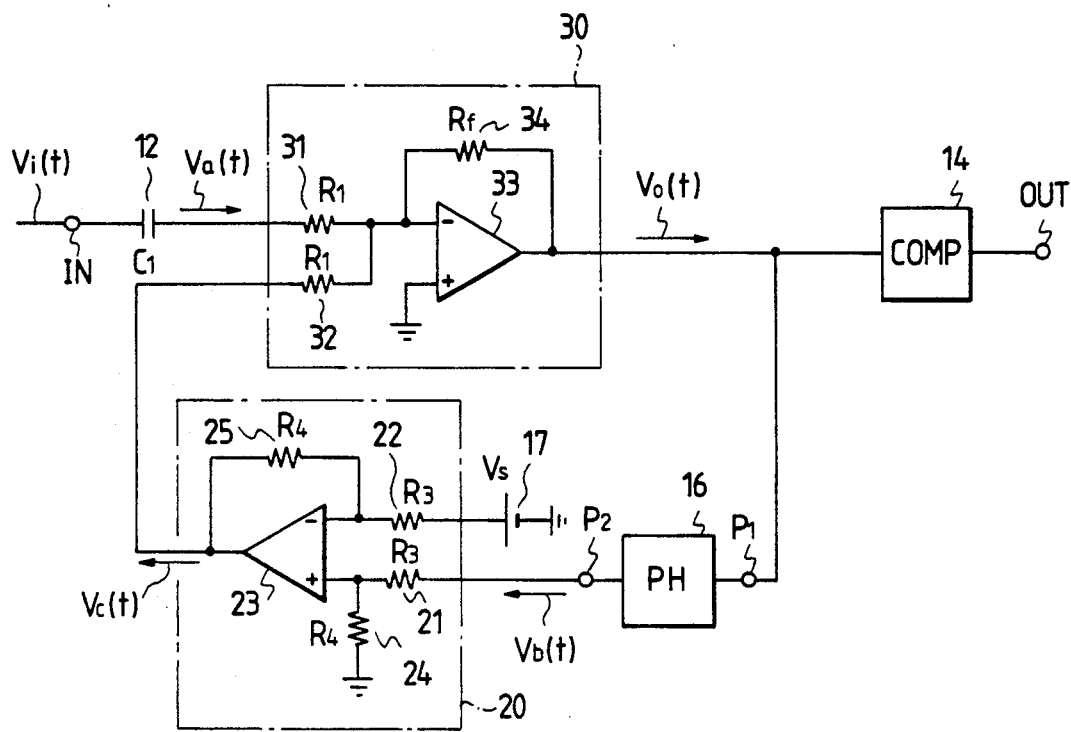
FIG. 3 is a circuit diagram illustrating an embodiment of the present invention.

Referring now to FIGS. 3 and 4, an embodiment of the present invention will be described. A digital signal Vi(t) applied to an input terminal IN is provided via a DC blocking capacitor 12 and a resistor 31 of a summing amplifier 30 to an inverting input terminal of an operational amplifier 33. The output Vo(t) of the operational amplifier 33 is applied to a comparator 14 and a peak hold circuit 16. The peak hold circuit 16 holds a positive peak value of the voltage waveform of the output Vo(t). Consequently, the output voltage Vb(t) of the peak hold circuit 16 is as follows:

$$Vb(t) \geq 0 \qquad (1)$$

This voltage is applied to one input terminal of a differential amplifier 20, in which a voltage of the difference between the voltage Vs (an output voltage of a power supply 17) provided to the other input terminal is amplified K-fold. That is, an output voltage Vc(t) expressed by the following equation (2) is provided via a resistor 32 of the summing amplifier 30 to the inverting input terminal of the operational amplifier 33.

$$Vc(t) = K\{Vb(t) - Vs\} \qquad (2)$$

Assuming that the differential amplifier 20 has such a known arrangement as shown in FIG. 3 and letting the resistance values of both of resistors 21 and 22 connected in series to non-inverting and inverting input terminals of an operational amplifier 23 be represented by $R_3$ and the resistance values of both of a resistor 24 connected between the non-inverting input terminal and a common potential point and a negative feedback resistor 25 be represented by $R_4$, the amplification factor K of the differential amplifier 20 is given by $$K = R_4/R_3 \quad (3)$$

The output of the operational amplifier 33 in the summing amplifier 30 is negatively fed back to its inverting input terminal via a resistor 34. The operational amplifier 33 and the resistors 31, 32 and 34 constitute the summing amplifier 30 as is well-known in the art. Letting a voltage fed to one end of the resistor 31 and the amplification factor of the summing amplifier 30 be represented by Va(t) and Af, respectively, the output voltage Vo(t) is given by $$Vo(t) = -Af\{Va(t) + Vc(t)\} \quad (4)$$

$$Af = Rf/R_1 \quad (5)$$

where $R_1$ is the resistance value of each of the resistors 31 and 32 and Rf is the resistance value of the resistor 34. In the following description the voltages Vo(t), Va(t), Vb(t) and Vc(t) will be identified by Vo, Va, Vb and Vc for the sake of simplicity.

The input resistance of the summing amplifier 30, viewed from the capacitor 12 side, is equal to the resistance value $R_1$ as is well-known in the art. If a square-wave voltage Vi having a peak value 2E as shown at row A in FIG. 4 is suddenly applied to the input terminal IN at a time t=0, the input voltage Va of the summing amplifier 30 has a transient waveform as shown at row B in FIG. 4. Where the voltage Vi is a continuous square wave having a duty ratio of 50%, the voltage e(t) of the negative envelope of the input voltage Va is given by $$e(t) = -E\left\{1 - \exp\frac{-t}{C_1 R_1}\right\} \quad (6)$$

The envelope voltage e(t), in general, has a gently varying waveform depending on the code configuration of the input digital signal and the time constant $C_1 R_1$. As will be seen from comparison of the Waveforms Of the voltages Vi and Va shown in FIG. 4, the voltage Va is substantially equal to the sum of the voltage e(t) and the input voltage Vi. That is, the following equation holds:

$$Va \approx Vi + e \quad (7)$$

Accordingly, the output voltage Vo becomes as follows:

$$\begin{aligned} Vo &= -Af \cdot \{Vi + e + Vc\} \\ &= Af \cdot \{-Vi - e - Vc\} \end{aligned} \quad (8)$$

As will be seen from row A in FIG. 4, $-Vi$ in the above is given by $$-Vi = -2E \text{ or } 0 \quad (9)$$

and, as will be seen from row B in FIG. 4, $-e$ is as follows;

$$-e \geq 0 \quad (10)$$

The output Vb of the peak hold circuit 16 ought to be a voltage nearly equal to the voltage of an envelope joining peak values of the waveform of the output voltage Vo, and hence varies very slowly with time t (as compared with the voltage Vi). Consequently, $-Vc$ in Eq. (8) also varies slowly. Consider the envelope of the waveform of the voltage Vo expressed by Eq. (8). It is seen, in this instance, that a curve joining levels of the voltage Vo in respective periods during which $-Vi = -2E$ is an envelope joining troughs of the waveform of the voltage Vo, and that a curve joining levels of the voltage Vo in respective periods during which Vi=0 is an envelope joining crests or peak values of the waveform of the voltage Vo. Accordingly, the voltage Vb can be obtained by setting $Vi = -$ in Eq. (8) and can be expressed as follows:

$$Vb = -Af \cdot \{e + Vc\} \quad (11)$$

Modifying Eq. (2) by Eq. (11), it follows that $$\begin{aligned} Vc &= K \cdot (Vb - Vs) \\ &= K \cdot (-Af \cdot e - Af \cdot Vc - Vs) \end{aligned}$$

Hence, Vc becomes as follows:

$$Vc = \frac{-K \cdot Af \cdot e - K \cdot Vs}{1 + K \cdot Af} \quad (12)$$

Substitution of Eq. (12) into Eq. (8) gives $$\begin{aligned} Vo &= -Af\left(Vi + e - \frac{K \cdot Af \cdot e + K \cdot Vs}{1 + K \cdot Af}\right) \\ &= -Af\left\{Vi + e \times \left(1 - \frac{K \cdot Af}{1 + K \cdot Af}\right)\right\} + \\ &\quad \frac{K \cdot Af \cdot Vs}{1 + K \cdot Af} \end{aligned} \quad (13)$$

In the above, K·Af is set to $$K \cdot Af \geq 1 \quad (14)$$

Hence, Vo becomes as follows:

$$Vo \approx -Af \cdot Vi + Vs \quad (15)$$

The voltage Vo is a square wave which has a maximum value Vs and a minimum value $-2EAf$ as shown at row C in FIG. 4. In other words, the peak value (the point of Vi=0) at the trough of the waveform of the amplifier input Vi is controlled at the amplifier output such that $Vo \approx Vs$.

Even if the small-amplitude second digital signals p are input in the periods during which Vi=0 as shown at row D in FIG. 4, all the second signals p can be detected as shown at row D in FIG. 4, by setting the threshold voltage $V_T$ of the comparator 14 to a level crossing second signal outputs p' as depicted at row C in FIG. 4.

Since the positive peak value of the voltage Vo is equal to the voltage Vs, the voltage Vb is nearly equal to the voltage Vs; so that the voltage Vc is substantially zero.

Where the input signal Vi is very small or zero, Vo=Vs from Eq. (15).

As will be appreciated from the above, the receiving amplifier is composed of the DC blocking capacitor 12, the summing amplifier 30, the peak hold circuit 16 and the differential amplifier 20.

Figure 5A:
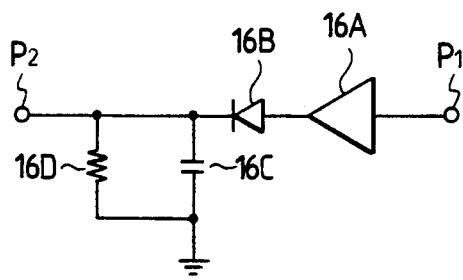
FIG. 5A is a circuit diagram showing an example of a peak hold circuit 16 employed in the FIG. 3 embodiment; and, FIG. 5B is a circuit diagram illustrating a modified form of the peak hold circuit 16.
Figure 5B:
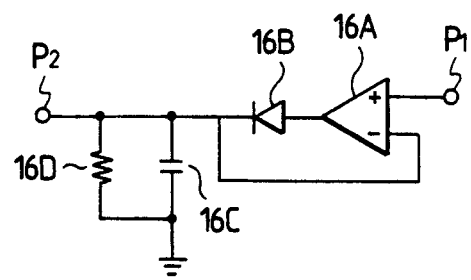

FIG. 5A illustrates an example of the peak hold circuit 16 in which a buffer amplifier 16A and a diode 16B are cascade-connected between input and output terminals $P_1$ and $P_2$ and the output terminal $P_2$ is connected to a common potential point via a parallel circuit of a capacitor 16C and a resistor 16D. In this circuit the threshold voltage of the diode 16B varies with temperature and the rectification characteristic somewhat varies accordingly. To lessen the influence of temperature, it is possible to employ a known circuit as shown in FIG. 5B, in which an operational amplifier is used as the buffer amplifier 16A, the output end of the diode 16B is connected to an inverting input terminal of the amplifier 16A, and the input terminal $P_1$ is connected to its non-inverting input terminal.

While in the above the receiving amplifier is described to have a DC blocking capacitor at its input side, the present invention is not limited specifically thereto; a transformer may be used in place of the capacitor, and such a capacitor or transformer can be dispensed with.

As described above, according to the present invention, the OFF level of the input signal is clamped to a peak value equal to the reference voltage Vs. Even in the case where, in the OFF period of the large-amplitude first digital signal, a second digital signal far smaller in amplitude than the first signal is input, both signals can be detected in the comparator of the next stage.

It will be apparent that many modifications and variations may be effected without departing from the scope of the novel concepts of the present invention.

I claim:

1. A signal receiver which amplifies a digital input signal having either an OFF level or an ON level and compares it with a threshold value to perform a level decision, comprising:

summing amplifier means having first and second input terminals, for summing and amplifying two signals input thereto;

comparator means connected to the output of said summing amplifier means for comparing said output with said threshold value;

peak hold circuit means connected directly to the output of said summing amplifier means for holding a peak level of said output which corresponds to the OFF level of the digital input signal;

reference voltage generator means for generating a fixed reference voltage; and differential amplifier means supplied with the output of said peak hold circuit means and said reference voltage from said reference voltage generator means, for amplifying the difference between the output of the peak hold circuit means and the reference voltage;

said digital input signal and the output of said differential amplifier means being applied to said first and second input terminals of said summing amplifier means, respectively, to effect a feedback operation which causes the OFF level of the digital input signal to be clamped to said reference voltage.

2. The signal receiver of claim 1, wherein DC blocking means is connected to said first input terminal of said summing amplifier means, for blocking a DC component of said digital input signal, said digital input signal being provided via said DC blocking means to said first input terminal.

3. The signal receiver of claim 1, wherein the product of the amplification factors of said summing amplifier means and said differential amplifier means is greater than 1.

* * * * *